United States Patent
Ito

(10) Patent No.: US 10,540,582 B2
(45) Date of Patent: Jan. 21, 2020

(54) METHOD FOR CREATING COLOR CONVERSION TABLE

(71) Applicant: SEIKO EPSON CORPORATION, Tokyo (JP)

(72) Inventor: Takashi Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/062,837

(22) PCT Filed: Dec. 2, 2016

(86) PCT No.: PCT/JP2016/085935
§ 371 (c)(1),
(2) Date: Jun. 15, 2018

(87) PCT Pub. No.: WO2017/104449
PCT Pub. Date: Jun. 22, 2017

(65) Prior Publication Data
US 2019/0026611 A1    Jan. 24, 2019

(30) Foreign Application Priority Data
Dec. 18, 2015   (JP) .................................. 2015-247233

(51) Int. Cl.
*G06K 15/00* (2006.01)
*B41J 2/525* (2006.01)
(Continued)

(52) U.S. Cl.
CPC .......... *G06K 15/4075* (2013.01); *B41J 2/525* (2013.01); *G06K 15/00* (2013.01); *G06K 15/102* (2013.01);
(Continued)

(58) Field of Classification Search
None
See application file for complete search history.

(56) References Cited

U.S. PATENT DOCUMENTS 5,398,121 A * 3/1995 Kowalewski ........ H04N 1/6019
358/504
2004/0234127 A1 11/2004 Arai et al.
(Continued)

FOREIGN PATENT DOCUMENTS

JP   2004-140577 A   5/2004
JP   2004-140578 A   5/2004
(Continued)

OTHER PUBLICATIONS

The Extended European Search Report for the corresponding European Patent Application No. 16875432.3 dated Jul. 9, 2019.

*Primary Examiner* — Frantz Bataille
(74) *Attorney, Agent, or Firm* — Global IP Counselors, LLP

(57) ABSTRACT

The purpose of the present invention is to create a color conversion table with good gradation using a plurality of inks from a printer. Provided is a method for creating a color conversion table, the method comprising: a virtual color value determination process in which a plurality of virtual color values at a lattice point in a color conversion table in a virtual color space are determined; and an ink amount determination process in which a combination of ink amounts at the lattice point in the color conversion table is determined on the basis of a predetermined conversion coefficient and the virtual color values. At least one of the virtual color value determination process and the ink amount determination process is executed using a cubic spline function that is defined from the plurality of virtual color values or the ink amounts.

12 Claims, 8 Drawing Sheets

(51) Int. Cl.
*H04N 1/60* (2006.01)
*G06T 1/00* (2006.01)
*H04N 1/46* (2006.01)
*G06K 15/10* (2006.01)

(52) U.S. Cl.
CPC ............... *G06T 1/00* (2013.01); *H04N 1/46* (2013.01); *H04N 1/60* (2013.01); *H04N 1/6016* (2013.01); *H04N 1/6019* (2013.01); *H04N 1/6058* (2013.01)

(56) References Cited

U.S. PATENT DOCUMENTS

| | | |
|---|---|---|
| 2004/0263879 A1 | 12/2004 | Ito et al. |
| 2004/0263880 A1 | 12/2004 | Ito et al. |
| 2004/0263881 A1 | 12/2004 | Ito et al. |
| 2004/0263882 A1 | 12/2004 | Ito et al. |
| 2005/0094169 A1 | 5/2005 | Berns et al. |
| 2005/0094871 A1 | 5/2005 | Berns et al. |
| 2005/0146736 A1* | 7/2005 | Matsuoka ............ H04N 1/603 358/1.9 |
| 2005/0270600 A1 | 12/2005 | Ito et al. |
| 2006/0176529 A1 | 8/2006 | Ito et al. |
| 2006/0193018 A1 | 8/2006 | Ito et al. |
| 2006/0285742 A1 | 12/2006 | Arai et al. |
| 2007/0030505 A1 | 2/2007 | Ito et al. |
| 2011/0249280 A1* | 10/2011 | Ito ...................... H04N 1/6019 358/1.9 |

FOREIGN PATENT DOCUMENTS

| | | |
|---|---|---|
| JP | 2004-320624 A | 11/2004 |
| JP | 2004-320625 A | 11/2004 |
| JP | 2004-320626 A | 11/2004 |
| JP | 2004-320627 A | 11/2004 |
| JP | 2006-197080 A | 7/2006 |
| JP | 2006-217150 A | 8/2006 |
| JP | 2007-043488 A | 2/2007 |
| JP | 2007-511161 A | 4/2007 |
| JP | 2007-511175 A | 4/2007 |
| JP | 2007-516663 A | 6/2007 |
| JP | 2009-033239 A | 2/2009 |
| JP | 2009-188657 A | 8/2009 |
| JP | 2010-245966 A | 10/2010 |
| JP | 2011-223345 A | 11/2011 |
| JP | 2011-223392 A | 11/2011 |
| JP | 2011-223434 A | 11/2011 |
| JP | 2012-129905 A | 7/2012 |
| JP | 2015-142250 A | 8/2012 |
| JP | 2012-217075 A | 11/2012 |

* cited by examiner

METHOD FOR CREATING COLOR CONVERSION TABLE

CROSS-REFERENCE TO RELATED APPLICATIONS

This is a U.S. national phase application of PCT/JP2016/085935, filed on Dec. 2, 2016, which claims priority to Japanese Patent Application No. 2015-247233, filed on Dec. 18, 2015. The entire disclosure of Japanese Patent Application No. 2015-247233 is hereby incorporated herein by reference.

TECHNICAL FIELD

The present invention relates to a method for creating a color conversion table for determining an ink volume discharged by a printer.

BACKGROUND ART

As a known color conversion table for converting an input color system into an output color system, JP-A-2009-188657 describes a technology of determining an ink volume serving as an output color system corresponding to a plurality of lattice points of an input color system by defining a quadratic form function corresponding to the plurality of lattice points as an objective function and by minimizing the objective function. (See also, JP-T-2007-511161, JP-T-2007-516663, and JP-T-2007-511175)

SUMMARY

However, the technology described in JP-A-2009-188657 repeats a process of determining the ink volume that reproduce a chromatic value with fine gradation. This yields a chromatic value with fine gradation, but often does not lead to ink volume with fine gradation.

An advantage of some aspects of the present invention is to solve the above-described problem. The present invention can be realized as the following modes to achieve a fine gradation in both ink volume and chromatic value.

(1) According to an aspect of the present invention, a method for creating a color conversion table for determining an ink volume discharged by a printer is provided. The method for creating the color conversion table includes a virtual chromatic value determination process of determining a plurality of virtual chromatic values in a virtual color space and an ink volume determination process of determining a combination of the ink volumes at a lattice point in the color conversion table based on a predetermined transformation coefficient and the virtual chromatic value. At least one of the virtual chromatic value determination process or the ink volume determination process is performed using a cubic spline function defined by the plurality of virtual chromatic values or the ink volumes. With the method for creating the color conversion table according to the aspect, a color conversion table for determining both virtual chromatic value and ink volume with a fine gradation can be created. The virtual chromatic value with a finer gradation leads to a visually noticeable fine gradation in the chromatic value. Moreover, the creation method according to the aspect allows a color conversion table to be prepared in advance, and also allows a color conversion table to be created when the printing environment is adjusted or printing is performed. This enables printer a user to obtain a print result matching the user's intention, and increases convenience for the users. The user's intension herein refers to, for example, settings such as an increase in ink usage limit for high density printing. The creation method for the aspect also achieves a fine gradation in both the chromatic value and the ink volume under the above-described settings.

(2) In accordance with the method for creating the color conversion table according to the above-described aspect, at least one of the virtual chromatic value determination process and the ink volume determination process defines a first cubic spline function, the first cubic spline function having the virtual chromatic value or the ink volume as a dependent variable and a value of a lattice point in a device color system as an independent variable with respect to three consecutive lattice points to be processed. the three consecutive lattice points to be processed including an intermediate lattice point with the virtual chromatic value or the ink volume to be determined and two end lattice points with the virtual chromatic values or the ink volumes are already determined sandwiching the intermediate lattice point, and determines the virtual chromatic value or the ink volume at the intermediate lattice point to minimize a sum of squares of second-order derivative parameters of the first cubic spline function at the three lattice points to be processed. The method for creating the color conversion table according to the aspect prevents the absolute values of the second-order derivative parameters from increasing, resulting in a finer gradation.

(3) In accordance with the method for creating the color conversion table according to the above-described aspect, at least one of the virtual chromatic value determination process or the ink volume determination process defines a first cubic spline function, the first cubic spline function having a virtual chromatic value or an ink volume as a dependent variable and a value of a lattice point in a device color system as an independent variable with respect to three consecutive lattice points to be processed, the three consecutive lattice points to be processed including an intermediate lattice point with the virtual chromatic value or the ink volume to be determined and two end lattice points with the virtual chromatic values or the ink volumes that are already determined sandwiching the intermediate lattice point, defines a second cubic spline function, the second cubic spline function having a virtual chromatic value or an ink volume as a dependent variable and a value of a lattice point in a device color system as an independent variable with respect to another three lattice points with the virtual chromatic values and the ink volumes that are already determined, the another three lattice points being respectively adjacent to the three lattice points to be processed in a direction different from a direction of definition of the first cubic spline function, the second cubic spline function being defined in a direction identical to the direction of definition of the first cubic spline function, and determines the virtual chromatic value or the ink volume at the intermediate lattice point to minimize a sum of squares of differences between a first-order derivative parameter determined by the first cubic spline function and a first-order derivative parameter determined by the second cubic spline function of respective sets of the lattice points adjacent to each other in the direction different from the direction of definition of the first and second cubic spline functions. The method for creating the color conversion table according to the aspect makes the gradation achieved by the first cubic spline function and the gradation achieved by the second cubic spline function substantially coincide with each other, resulting in an excellent gradation in a hypersurface.

(4) In accordance with the method for creating the color conversion table according to the above-described aspect, at least one of the virtual chromatic value determination process or the ink volume determination process defines a first cubic spline function, the first cubic spline function having a virtual chromatic value or an ink volume as a dependent variable and a value of a lattice point in a device color system as an independent variable with respect to three consecutive lattice points to be processed, the three consecutive lattice points to be processed including an intermediate lattice point with the virtual chromatic value or the ink volume to be determined and two end lattice points with the virtual chromatic values or the ink volumes that are already determined sandwiching the intermediate lattice point, defines a second cubic spline function, the second cubic spline function having a virtual chromatic value or an ink volume as a dependent variable and a value of a lattice point in a device color system as an independent variable with respect to another three lattice points with the virtual chromatic values and the ink volumes that are already determined, the another three lattice points being respectively adjacent to the three lattice points to be processed in a direction different from a direction of definition of the first cubic spline function, the second cubic spline function being defined in a direction identical to the direction of definition of the first cubic spline function, and determines the virtual chromatic value or the ink volume at the intermediate lattice point to minimize a sum of squares of differences between a second-order derivative parameter determined by the first cubic spline function and a second-order derivative parameter determined by the second cubic spline function of respective sets of the lattice points adjacent to each other in the direction different from the direction of definition of the first and second cubic spline functions. The method for creating the color conversion table according to the aspect also makes the gradation achieved by the first cubic spline function and the gradation achieved by the second cubic spline function substantially coincide with each other, resulting in an excellent gradation in a hypersurface.

(5) The method for creating the color conversion table according to the above-described aspect may further includes a color reproduction range determination process of maximizing a color reproduction range in the virtual color space before the ink volume determination process. The method for creating the color conversion table according to the aspect can maximize the color reproduction range.

(6) The method for creating the color conversion table according to the above-described aspect may further includes an ink volume maximization process of increasing a sum total of values of the ink volumes. In accordance with the method for creating the color conversion table according to the aspect, light colored inks are actively used to reproduce high density. This leads to an improvement in graininess of printed images.

The present invention can also be realized in various modes other than the method. For example, the invention can be realized in modes such as an image display apparatus, various apparatuses that perform the method, a system including the various apparatuses, a computer program configured to realize a control method and a system for the various apparatuses, a recording media storing the computer program, and a data signal including the computer program and embodied in a carrier wave.

DESCRIPTION OF EMBODIMENTS

In this description, the following items are explained in the order listed.

A. First Embodiment:
A-1. Color Conversion Table Creating Module:
A-2. Color Conversion Table Creation Process:
A-2-1. Virtual Chromatic Value Determination Process:
A-2-2. Ink Volume-Virtual Chromatic Value Conversion Process:
A-2-3. Color Reproduction Range Determination Process:
A-2-4. Ink Volume Maximization Process:
A-2-5. Ink Volume Determination Process:
A-2-6. Gradation Optimizing Objective Function Generation Process:
A-3. Sample Evaluation:
B. Second Embodiment:
C. Third Embodiment:
D. Modified Example:

A. First Embodiment

Figure 1:
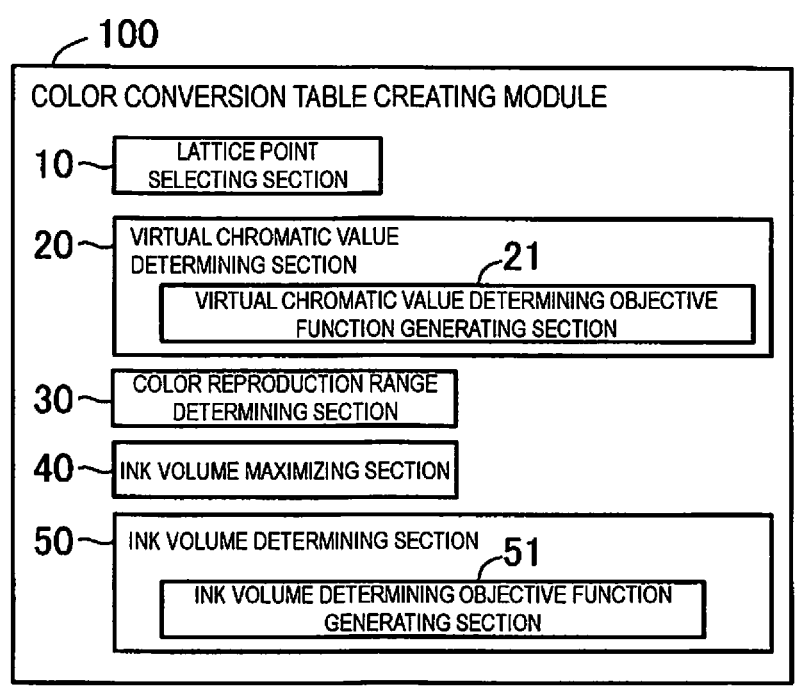
FIG. 1 is a block diagram illustrating a configuration of a color conversion table creating module creating a color conversion table according to a first embodiment.

A-1. Color Conversion Table Creating Module:

FIG. 1 is a block diagram illustrating a configuration of a color conversion table creating module 100 creating a color conversion table according to a first embodiment. The color conversion table creating module 100 of this embodiment creates a color conversion table that converts a device color system representing an input value to a device into an ink volume space including CMYK and R (red), which is a specific feature, provided for a printer. For example, a CMY space, a CMYK space, or a RGB space may be adoptable to the device color system. The color conversion table creating module 100 is a computer program stored in a memory of a personal computer (PC) and expanded to be executed. The color conversion table creating module 100 determines an ink volume at a lattice point in the color conversion table. The ink volumes at some of the lattice points may also be set. The ink volume at a lattice point without a set ink volume is determined using the set ink volume and the processes described below.

The color conversion table creating module 100 includes a lattice point selecting section 10, a virtual chromatic value determining section 20, a color reproduction range determining section 30, an ink volume maximizing section 40, and an ink volume determining section 50. When a color conversion table is created, a lattice point without a set ink volume is selected and processed individually. The lattice point selecting section 10 selects one lattice point to be processed.

The virtual chromatic value determining section 20 determines a virtual chromatic value with an optimized chromatic value gradation. The virtual chromatic value determining section 20 includes a virtual chromatic value determining objective function generating section 21 that generates an objective function for optimizing the gradation, and determines the virtual chromatic value using the generated objective function. The details of the processes executed by the virtual chromatic value determining section 20 and the virtual chromatic value determining objective function generating section 21 will be described in the section of a virtual chromatic value determination process below.

In a case where the lattice point to be processed selected at the lattice point selecting section 10 corresponds to a contour lattice point, the color reproduction range determining section 30 determines a combination of ink volumes that maximizes the color reproduction range from available combinations of ink volumes using the virtual chromatic value determined at the virtual chromatic value determining section 20 as a starting point. The contour lattice point refers to a lattice point existing on the contour of the color reproduction range in terms of the arrangement of the lattice point, and, in general, has higher saturation than the other lattice points. Moreover, the relationship between the ink volume determined at the color reproduction range determining section 30 and the resulting virtual chromatic value having the maximized color reproduction range is provided in an ink volume-virtual chromatic value conversion process described below. The details of the process executed by the color reproduction range determining section 30 will be described in the section of a color reproduction range determination process.

The ink volume maximizing section 40 determines an ink volume to be discharged to printing media, the sum of the ink volumes being maximum, using the virtual chromatic value determined at the virtual chromatic value determining section 20 or the virtual chromatic value resulting from the ink volume determined at the color reproduction range determining section 30. In other words, there are countless combinations of the ink volumes corresponding to the virtual chromatic values, and the ink volume maximizing section 40 determines a combination of ink volumes of which sum is maximum. To maximize the sum of the ink volumes at the ink volume maximizing section 40, the correspondence relationship for maintaining the virtual chromatic values is provided in the ink volume-virtual chromatic value conversion process described below. The details of the process executed by the ink volume maximizing section 40 will be described in the section of an ink volume maximization process.

The ink volume determining section 50 determines an ink volume with an optimized gradation using the virtual chromatic value and the sum of the ink volumes, wherein the virtual chromatic value is determined at the virtual chromatic value determining section 20 or the virtual chromatic values resulting from the ink volume determined at the color reproduction range determining section 30 and the sum of the ink volume is determined at the ink volume maximizing section 40. The ink volume determining section 50 includes an ink volume determining objective function generating section 51 that generates an objective function for optimizing the gradation, and determines the ink volume using the generated objective function. The details of the processes executed by the ink volume determining section 50 and the ink volume determining objective function generating section 51 will be described in the section of an ink volume determination process below.

Figure 2:
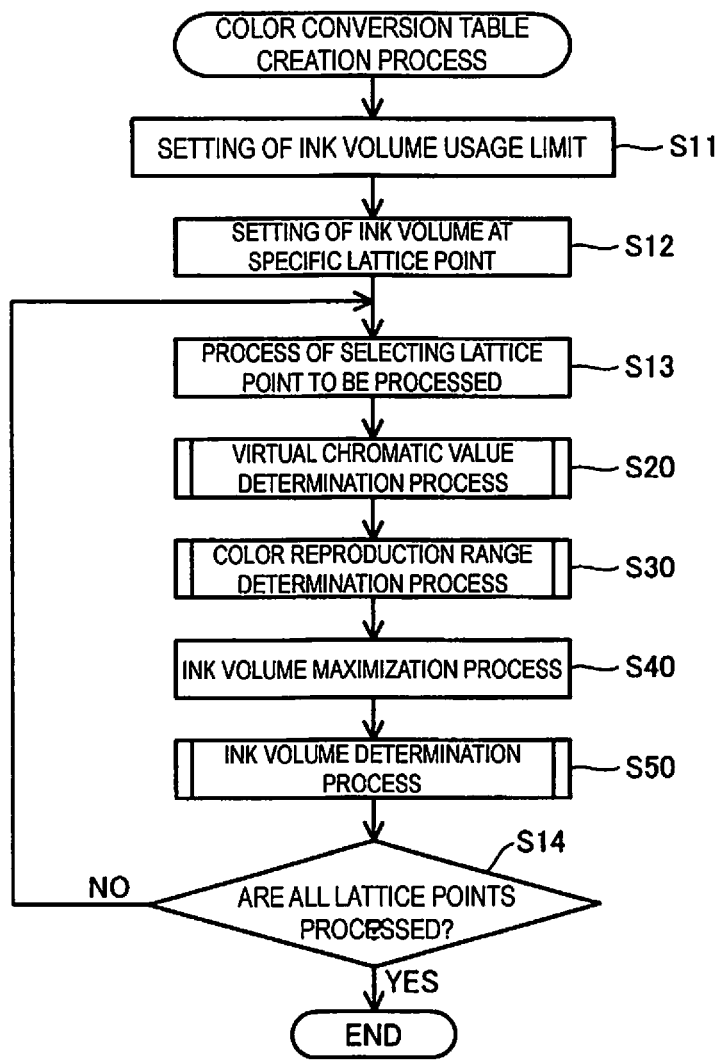
FIG. 2 is a flowchart of a color conversion table creation process.

A-2. Color Conversion Table Creation Process:

FIG. 2 is a flowchart of a color conversion table creation process. In the color conversion table creation process, the color conversion table creating module 100 determines an ink volume at a lattice point in a color conversion table. The color conversion table creating module 100 sets a usage limit on the ink volume in response to a user operation and the like as an initial setting (Step S11), and directly sets the ink volume corresponding to a specific lattice point in response to the user operation (Step S12).

Once the usage limit on the ink volume and the ink volume corresponding to the specific lattice point used in the following processes are set, the lattice point selecting section 10 of the color conversion table creating module 100 selects a lattice point of which the ink volume is to be determined (Step S13). The lattice point selecting section 10 uses a known technology described in, for example, JP-A-2011-223345 as a method for selecting a lattice point to be processed. In this embodiment, as in the selecting method described in JP-A-2011-223345, the lattice point selecting section 10 sequentially provides a lattice point number from 1 to N to each of N lattice points per one dimension of the color conversion table, and then sets a sequence of processing, the first lattice point and the Nth lattice points at both ends being the first and the second in the sequence, respectively. The lattice point selecting section 10 then sets the sequence of processing for a lattice point having a lattice point number of $(1+N)/2$ (integer) determined using the bisection method based on the lattice point number to be the third in the sequence. Subsequently, the lattice point selecting section 10 executes the similar process on the rest of the lattice points, and sequentially selects a lattice point without a determined ink volume in the determined processing sequence.

According to the method for determining the processing sequence, once the ink volumes of the lattice points having the lattice point number 1 and the lattice point number N are determined, the lattice point at which the ink volume is to be determined is defined as an intermediate lattice point, and the intermediate lattice point is interposed between end lattice points with determined ink volumes. These three lattice points constitute a basic configuration to be processed. The three lattice points constituting the basic configuration correspond to three lattice points to be processed in the claims.

The lattice point at which the ink volume is to be determined is selected, and the virtual chromatic value determining section 20 of the color conversion table creating module 100 executes a virtual chromatic value determination process to determine the virtual chromatic value of the lattice point to be processed (Step S20). In the virtual chromatic value determination process, which will be described in detail below, the virtual chromatic value of the lattice point to be processed is determined to optimize the gradation in the virtual chromatic value using the virtual chromatic values of the lattice points, sandwiching the lattice point to be processed and having the ink volumes determined according to the processing sequence. The lattice point to be processed corresponds to an intermediate lattice point in the claims.

The virtual chromatic value determination process is executed, and the color reproduction range determining section 30 of the color conversion table creating module 100 executes a color reproduction range determination process to maximize the color reproduction range within the limit of ink volume usage specified by a user and the like (Step S30). The details of the color reproduction range determination process will be described below.

The virtual chromatic value is determined in the virtual chromatic value determination process or in the color reproduction range determination process, and the ink volume maximizing section 40 executes an ink volume maximization process to maximize the sum of the ink volumes corresponding to the lattice point to be processed (Step S40). The details of the ink volume maximization process will be described below.

The ink volume maximization process is executed, and the ink volume determining section 50 executes the ink volume determination process to determine the ink volume corresponding to the lattice point to be processed to optimize the gradation in the ink volume (Step S50). In the ink volume determination process, which will be described in detail below, the ink volume at the lattice point to be processed is determined to optimize the gradation in the ink volume using the ink volumes of the lattice points sandwiching the lattice point to be processed and having the ink volumes determined according to the processing sequence.

The ink volume determination process is executed, and the lattice point selecting section 10 determines whether or not a lattice point without determined ink volume exists (Step S14). Note that the lattice point with determined ink volume include the lattice point having the ink volume determined at the initial setting. In a case where the lattice point selecting section 10 determines that there is a lattice point without determined ink volume (No in Step S14), the process returns to Step S13 to select a new lattice point to be processed from the lattice point without determined ink volume. A new lattice point to be processed is selected, and the color conversion table creating module 100 repeats the processes after Step S20. In a case where absence of a lattice point without determined ink volume is confirmed in Step S13 (Yes in Step S14), the color conversion table creating module 100 ends the color conversion table creation process.

Figure 3:
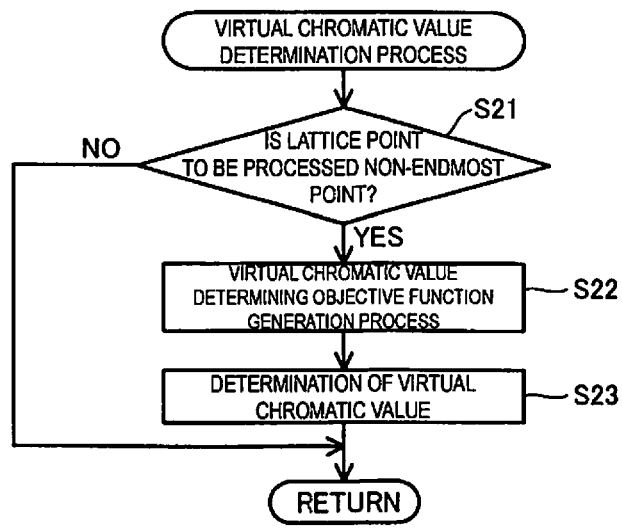
FIG. 3 is a flowchart of a virtual chromatic value determination process.

A-2-1. Virtual Chromatic Value Determination Process:

FIG. 3 is a flowchart of the virtual chromatic value determination process. In the virtual chromatic value determination process, the virtual chromatic value determining section 20 first determines whether or not the lattice point to be processed is an endmost lattice point (Step S21). The endmost lattice point refers to the first or Nth lattice point in the case where the number of lattice points per one dimension is N. In a case where the lattice point to be processed is an endmost lattice point (No in Step S21), the virtual chromatic value determination process ends. In a case where the lattice point to be processed is not an endmost lattice point (Yes in Step S21), the virtual chromatic value determining objective function generating section 21 sets an objective function for optimizing the gradation (Step S22).

Figure 4:
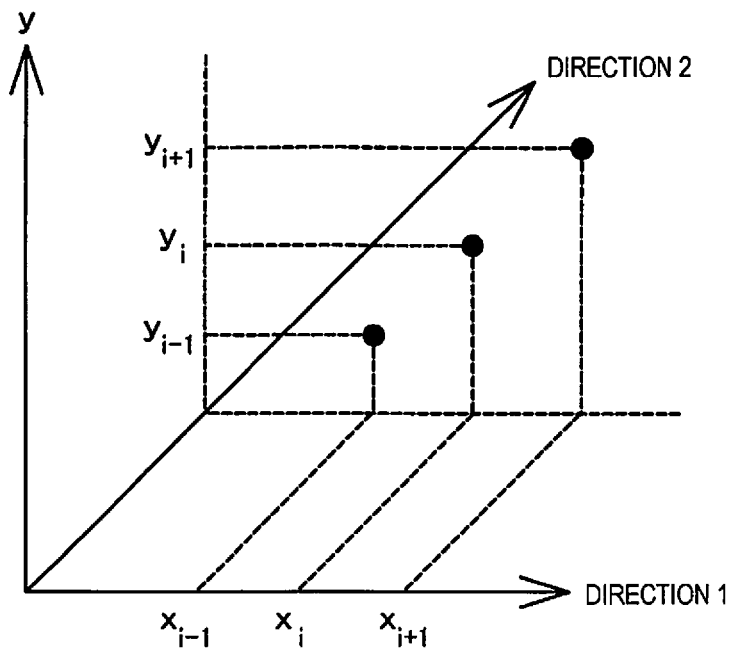
FIG. 4 is a schematic view illustrating an outline of a process of a virtual chromatic value determining objective function generating section.

FIG. 4 is a schematic view illustrating an outline of the process of the virtual chromatic value determining objective function generating section 21. For simplicity, FIG. 4 illustrates a case where the device color system is two-dimensional. Moreover, y illustrated in FIG. 4 indicates a value in a dimension of a virtual chromatic value space. Other dimensions are also represented by y illustrated in FIG. 4 because any of the other dimensions can be independently processed. The virtual chromatic value determining objective function generating section 21 first determines a direction 1 illustrated in FIG. 4 as a direction of definition of a first cubic spline function. The virtual chromatic value determining objective function generating section 21 then identifies the lattice point to be processed by i, and identifies the two lattice points by i−1 and i+1, wherein the two lattice points sandwiching the lattice point to be processed in the direction of definition of the first cubic spline function and having the virtual chromatic values that are already determined. The values $x_{i-1}$, $x_i$, and $x_{i+1}$ of the device color system at the respective lattice points identified by i−1, i, and i+1 are defined as an independent variable, and the corresponding virtual chromatic values $y_{i-1}$, $y_1$, and $y_{i+1}$ are defined as a dependent variable. Note that the virtual chromatic value $y_i$ is not determined. Next, the virtual chromatic value determining objective function generating section 21 determines a direction 2 illustrated in FIG. 4 as a direction of definition of a first cubic spline function, and similarly determines a set of an independent variable and a dependent variable.

FIG. 4 illustrates a case where the device color system is two-dimensional. In a case where the device color system is of a higher dimension, combinations of independent and dependent variables are similarly determined. The virtual chromatic value determining objective function generating section 21 then sets an objective function for optimizing the gradation using the combinations of the independent and dependent variables determined as above using a method described in the section of a gradation optimizing objective function generation process below.

After acquiring the objective function for optimizing the gradation at the virtual chromatic value determining objective function generating section 21, the virtual chromatic value determining section 20 calculates the virtual chromatic value $y_i$ to minimize the objective function to determine the virtual chromatic value with optimized gradation in Step S23. Various methods such as typical solutions for optimization problems can be used to determine the virtual chromatic values. With the calculation of the virtual chromatic value, a first-order derivative parameter $y'_i$ and a second-order derivative parameter $y''_i$ of the lattice point to be processed are also determined. A method for calculating the first-order derivative parameter $y'_i$ and the second-order derivative parameter $y''_i$ is also described in the section of the gradation optimizing objective function generation process.

A-2-2. Ink Volume-Virtual Chromatic Value Conversion Process:

A process of converting ink volume into virtual chromatic value will now be described. The process is used in the color reproduction range determination process, the ink volume maximization process, and the ink volume determination process described below. The conversion is performed by solving Equation (1) using a vector q having the ink volume as an element, a vector p having the virtual chromatic value as an element, and a coefficient matrix K.

[Equation 1]

$$p = Kq \qquad (1)$$

The coefficient matrix K is a matrix with rows and columns, the number of rows corresponding to the number of dimensions of the virtual chromatic value space and the number of columns corresponding to the number of inks, and is determined based on the color developing characteristics of inks. In a case where CMYKR inks are used as described above, elements in Equation (2), for example, are used. Note that the virtual chromatic values are assumed to be values in a CMY space.

[Equation 2]

$$K = \begin{bmatrix} 1 & 0 & 0 & 1 & 0 \\ 0 & 1 & 0 & 1 & 1 \\ 0 & 0 & 1 & 1 & 1 \end{bmatrix} \qquad (2)$$

The elements of the coefficient matrix K may be determined from qualitative features of the color developing characteristics, or may be determined by a quantitative method using color measurement results of the inks. The conversion by Equation (1) is used in the color reproduction range determination process, the ink volume maximization process, and the ink volume determination process.

Figure 5:
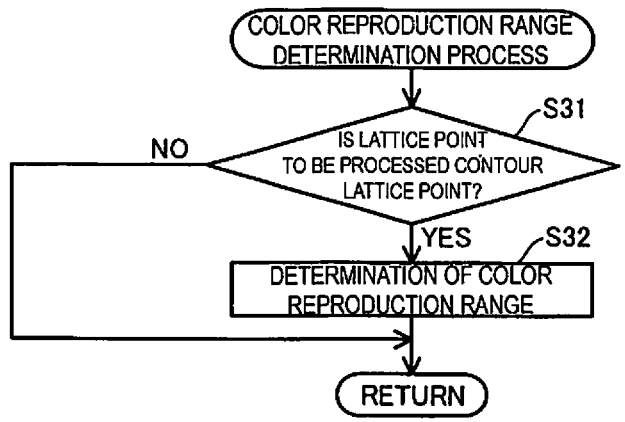
FIG. 5 is a flowchart of a color reproduction range determination process.

A-2-3. Color Reproduction Range Determination Process:

FIG. 5 is a flowchart of a color reproduction range determination process. In the color reproduction range determination process, the color reproduction range determining section 30 determines whether the lattice point to be processed is a contour lattice point (Step S31). The contour lattice point refers to a lattice point located on the contour of a color reproduction range, and, in general, reproduces relatively higher saturation than the other lattice points. In a case where the lattice point to be processed is not a contour lattice point (No in Step S31), the color reproduction range determining section 30 does not execute the color reproduction range determination process. In a case where the lattice point to be processed is confirmed as a contour lattice point (Yes in Step S31), the color reproduction range determining section 30 determines a color reproduction range (Step S32).

Figure 6:
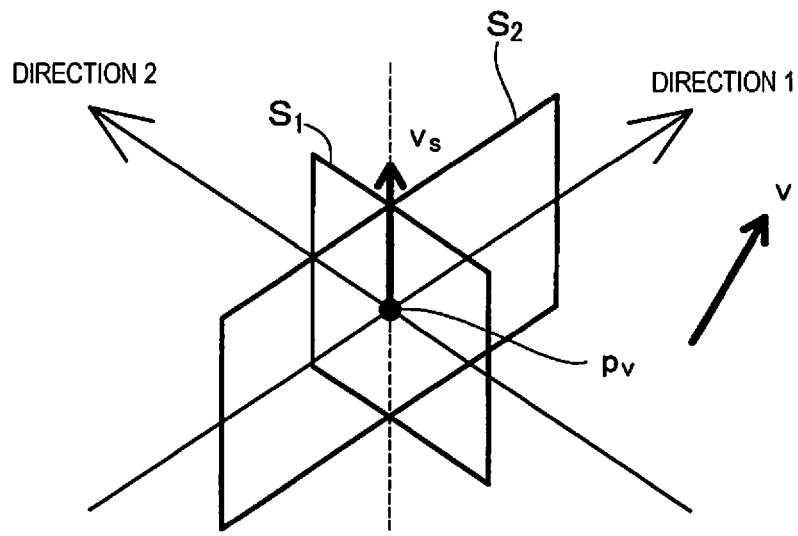
FIG. 6 illustrates maximization of a color reproduction range in a case of a two-dimensional contour surface.

A specific method for determining the color reproduction range will now be described with reference to FIG. 6. FIG. 6 illustrates maximization of the color reproduction range in a case of a two-dimensional contour surface. FIG. 6 is a schematic diagram illustrating an expanding direction v in the color reproduction range and the two-dimensional contour surface, and illustrating a virtual color space for illustrating the process of maximizing the color reproduction range. First, the expanding direction v is determined in the virtual color space. For example, in a case where the device color system and the virtual color space are CMY spaces and a contour surface forms a partial space with C and M when Y value is maximum, the direction of the virtual CMY in which the color reproduction range can be expanded is determined to be, for example, (C, M, Y)=(0, 0, 1). The expanding direction v in which the color reproduction range expands is determined as appropriate based on, for example, the characteristics of the transformation matrix K between the ink volumes and the virtual chromatic values. The determined expanding direction is illustrated as a vector v in FIG. 6.

Next, during the determination of the color reproduction range, some limitations are placed to avoid degradation of gradation in the virtual chromatic value. In FIG. 6, a point of the virtual chromatic value, determined in the virtual chromatic value determination process, in the virtual color space is expressed as $p_v$. The point $p_v$ of the virtual chromatic value optimizes the gradation in the virtual chromatic value. However, the point may not maximize the color reproduction range. Accordingly, the virtual chromatic value that maximizes the color reproduction range is determined to be the virtual chromatic value of the lattice point to be processed in the color reproduction range determination process. However, the virtual chromatic value determined to maximize the color reproduction range may not compatible with the virtual chromatic value with optimized gradation. Thus, the following limitation is placed to determine the virtual chromatic value with a maximized color reproduction range.

Planes $S_1$ and $S_2$ illustrated in FIG. 6 serve as the limitations described above. The limitation planes $S_1$ and $S_2$ pass through the virtual chromatic value $p_v$. Moreover, the limitation plane $S_1$ has a normal vector in a direction 1 illustrated in FIG. 6, and the limitation plane $S_2$ has a normal vector in a direction 2 illustrated in FIG. 6. The limitation planes $S_1$ and $S_2$ may be determined as follows. For example, in a case where the virtual chromatic value vectors of the lattice points $x_{i-1}$ and $x_{i+1}$ having virtual chromatic values that are already determined in the direction 1 illustrated in FIG. 6 are respectively defined as $p_{i-1}$ and $p_{i+1}$, the difference is $p_{i+1}-p_{i-1}$. This can be adopted as a normal vector of the illustrated plane $S_1$, and the plane passing through the virtual chromatic value $p_v$ can be expressed as Equation (3).

[Equation 3]

$$(p_{i+1}-p_{i-1})p = (p_{i+1}-p_{i-1})p_v \qquad (3)$$

Note that p is a vector representing arbitrary values in the virtual color space. Similarly, the limitation plane $S_2$ can be determined by regarding the direction 2 as the direction of definition of the normal vector of the limitation plane $S_2$.

Due to the limitations imposed by the limitation planes set as above, the virtual chromatic value maximizing the color reproduction range is searched on a straight line indicated by a broken line in FIG. 6. On the other hand, as illustrated in FIG. 6, the expanding direction vector v may not be parallel with the broken line in FIG. 6. However, the searching direction is limited to the direction of the broken line, and thus the color reproduction range is maximized in a case where the inner product of the virtual chromatic value p and the expansion vector v reaches the maximum on the broken line. In other words, to substantially maximize the color reproduction range, a point with a maximized color reproduction range is searched from the point $p_v$ in the direction of the vector $v_s$ illustrated in FIG. 6.

On the other hand, the virtual chromatic value p is replaced with the ink volume q using Equation (1) to maximize the color reproduction range. At this moment, the ink volume usage limit set in Step S11 illustrated in FIG. 2 is applied. As a result of application of the ink volume usage limit, the color reproduction range is maximized within an available range of the ink volume space. Depending on the relationship with the limit, the virtual chromatic value resulting from the maximization of the color reproduction range may not exist in the arrow side of the vector $v_s$ compared with the virtual chromatic value $p_v$ illustrated in FIG. 6, and may substantially correspond to compression of the virtual chromatic value $p_v$. The virtual chromatic value vector of the lattice point to be processed with the maximized color reproduction range determined as above is defined as $p_i$. To avoid confusion in the description below, the virtual chromatic value in Step S31 (No) in FIG. 5 is also referred to as $p_i$.

A-2-4. Ink Volume Maximization Process:

In the ink volume maximization process, the ink volume maximizing section 40 redetermines an ink volume vector q to maximize the total ink volume while maintaining the virtual chromatic value $p_i$ obtained in the virtual chromatic value determination process or in the color reproduction range determination process. The correspondence relationship between the virtual chromatic value $p_i$ and the ink volume q is determined by Equation (1). In the ink volume maximization process, the ink volume usage limit set in Step S11 in FIG. 2 is also applied to maximize the total ink volume within the range of the set ink volume usage limit.

Figure 7:
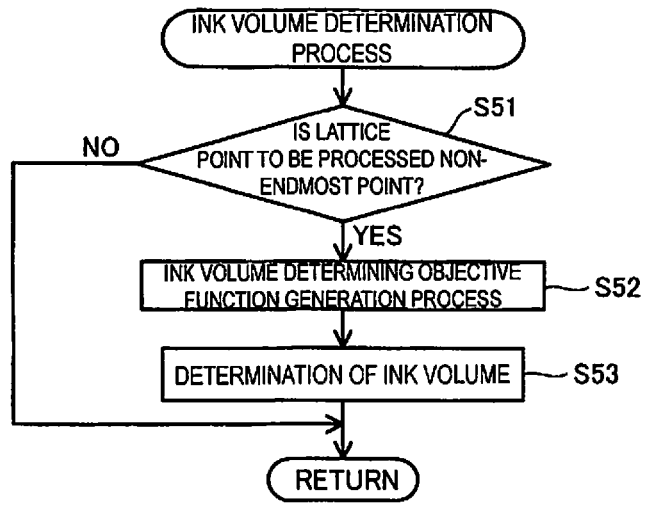
FIG. 7 is a flowchart of an ink volume determination process.

A-2-5. Ink Volume Determination Process:

FIG. 7 is a flowchart of the ink volume determination process. In the ink volume determination process, the ink volume determining section 50 determines whether or not the lattice point to be processed is an endmost lattice point (Step S51). In the case where the lattice point to be processed is an endmost lattice point (No in Step S51), the ink volume determination process ends. In the case where the lattice point to be processed is not an endmost lattice point (Yes in Step S51), the ink volume determining objective function generating section 51 sets an objective function for optimizing the gradation (Step S52).

As does the virtual chromatic value determining objective function generating section 21, the ink volume determining objective function generating section 51 defines the values $x_{i-1}$, $x_i$, and $x_{i+1}$ of the device color system at the respective lattice points identified by i−1, i, and i+1 as an independent variable, and defines the corresponding ink volumes $y_{i-1}$, $y_i$, and $y_{i+1}$ as a dependent variable. The ink volume determining objective function generating section 51 then sets an objective function for optimizing the gradation using a method described in the section of the gradation optimizing objective function generation process below.

After acquiring the objective function for optimizing the gradation at the ink volume determining objective function generating section 51, the ink volume determining section 50 calculates the ink volume $y_i$ to minimize the objective function to determine the ink volume with the optimized gradation (Step S53). Various methods such as typical solutions for optimization problems can be used to determine the ink volumes. Unlike the virtual chromatic value determination process, the ink volume usage limit set in Step S11 in FIG. 2 is to be satisfied in the ink volume determination process. Moreover, the virtual chromatic value $p_i$ determined in the virtual chromatic value determination process or in the color reproduction range determination process and the total ink volume determined in the ink volume maximization process are also to be maintained. Needless to say, the relationship maintained by the virtual chromatic value $p_i$ and the ink volume to be determined can be expressed by Equation (1). With the calculation of the ink volume, the first-order derivative parameter $y'_i$ and the second-order derivative parameter $y''_i$ of the lattice point to be processed are also determined. A method for calculating the first-order derivative parameter $y'_i$ and the second-order derivative parameter $y''_i$ is also described in the section of the gradation optimizing objective function generation process.

A-2-6. Gradation Optimizing Objective Function Generation Process:

The process of generating the objective functions generated at the virtual chromatic value determining objective function generating section 21 and the ink volume determining objective function generating section 51 will now be described in detail. For simplicity, a generation process in which the first cubic spline function is defined in one direction (a case of one dimension) will be described as an example. The one-dimensional cubic spline function can be defined with respect to an independent variable x and a dependent variable y by Equation (4).

[Equation 4]

$$y = \frac{x_{i+1} - x}{x_{i+1} - x_i} y_i + \frac{x - x_i}{x_{i+1} - x_i} y_{i+1} + \frac{1}{6}\left(\left(\frac{x_{i+1} - x}{x_{i+1} - x_i}\right)^3 - \frac{x_{i+1} - x}{x_{i+1} - x_i}\right)(x_{i+1} - x_i)^2 y''_i + \frac{1}{6}\left(\left(\frac{x - x_i}{x_{i+1} - x_i}\right)^3 - \frac{x - x_i}{x_{i+1} - x_i}\right)(x_{i+1} - x_i)^2 y''_{i+1} \quad (4)$$

Differentiating Equation (4) with respect to x yields Equation (5).

[Equation 5]

$$y' = \frac{1}{x_{i+1} - x_i}(y_{i+1} - y_i) - \frac{1}{2}\frac{(x_{i+1} - x)^2}{x_{i+1} - x_i} y''_i + \frac{1}{2}\frac{(x - x_i)^2}{x_{i+1} - x_i} y''_{i+1} - \frac{1}{6}(x_{i+1} - x_i)(y''_{i+1} - y''_i) \quad (5)$$

Under the condition that Equation (4) has an identical gradient at $x_i$, Equation (5) in the interval $x_{i-1} \leq x \leq x_i$ and Equation (5) in the interval $x_i \leq x \leq x_{i+1}$ yield Equation (6)

[Equation 6]

$$\frac{x_i - x_{i-1}}{6} y''_{i-1} + \frac{x_{i+1} - x_{i-1}}{3} y''_i + \frac{x_{i+1} - x_i}{6} y''_{i+1} = \frac{y_{i+1} - y_i}{x_{i+1} - x_i} - \frac{y_i - y_{i-1}}{x_i - x_{i-1}} \quad (6)$$

Note that i is an identifier of the lattice point, and y″ indicates the second-order derivative parameter at the respective lattice point.

Rearranging equations obtained by substituting $x = x_{i-1}$ and $x_{i+1}$ into Equation (6) and Equation (5) in the interval $x_{i-1} \leq x \leq x_i$ and in the interval $x_i \leq x \leq x_{i+1}$ yields Equation (7).

[Equation 7]

$$\begin{bmatrix} y''_{i-1} \\ y''_i \\ y''_{i+1} \end{bmatrix} = A^{-1} B \begin{bmatrix} y_{i-1} \\ y_i \\ y_{i+1} \end{bmatrix} + c \quad (7)$$

Where A and B, which represent matrices, and c, which represents a vector, are respectively defined by Equations (8) to (10). In addition, the matrix A with a −1 superscript indicates the inverse of the matrix A.

[Equation 8]

$$A = \begin{bmatrix} -\dfrac{x_i - x_{i-1}}{3} & -\dfrac{x_i - x_{i-1}}{6} & 0 \\ \dfrac{x_i - x_{i-1}}{3} & \dfrac{x_{i+1} - x_{i-1}}{3} & \dfrac{x_{i+1} - x_i}{6} \\ 0 & \dfrac{x_{i+1} - x_i}{6} & \dfrac{x_{i+1} - x_i}{3} \end{bmatrix} \quad (8)$$

[Equation 9]

$$B = \begin{bmatrix} \dfrac{1}{x_i - x_{i-1}} & \dfrac{1}{x_i - x_{i-1}} & 0 \\ \dfrac{1}{x_i - x_{i-1}} & -\dfrac{x_{i+1} - x_{i-1}}{(x_{i+1} - x_i)(x_i - x_{i-1})} & \dfrac{1}{x_{i+1} - x_i} \\ 0 & \dfrac{1}{x_{i+1} - x_i} & \dfrac{1}{x_{i+1} - x_i} \end{bmatrix} \quad (9)$$

[Equation 10]

$$c = \begin{bmatrix} y'_{i-1} \\ 0 \\ y'_{i+1} \end{bmatrix} \quad (10)$$

The second-order derivative parameter of the cubic spline function is obtained on the left side of Equation (7), and thus the objective function is defined by the sum of the squares, and is expressed as Equation (11).

[Equation 11]

$$E = {y''_{i-1}}^2 + {y''_i}^2 + {y''_{i+1}}^2 \quad (11)$$

As is clear from Equation (7), Equation (11) is a function of an unknown dependent variable $y_i$. Thus, determining $y_i$ that minimizes Equation (11) optimizes the gradation.

This is also applicable to a case of a multidimensional device color system by generating objective functions similar to Equation (11), a first cubic spline function being defined in the direction of each dimension, and adding up the objective functions. The resulting objective function can be defined by Equation (12), where i, j, . . . are identifiers of the dimensions and $E_i$, $E_j$, . . . are the objective functions of the respective dimensions.

[Equation 12]

$$E = E_i + E_j + \ldots \quad (12)$$

The virtual chromatic value determining objective function generating section 21 generates Equation (12) using the virtual chromatic value as the dependent variable of the first cubic spline function, and the ink volume determining objective function generating section 51 generates Equation (12) using the ink volume as the dependent variable of the first cubic spline function.

The first-order derivative parameter $y'_i$ and the second-order derivative parameter $y''_i$ of the virtual chromatic value are respectively determined using Equations (5) and (7) at the virtual chromatic value determining section 20, and thus are calculated at the virtual chromatic value determining section 20. The first-order derivative parameter $y'_i$ and the second-order derivative parameter $y''_i$ of the ink volume are respectively determined using Equations (5) and (7) at the ink volume determining section 50, and thus are calculated at the ink volume determining section 50.

On the other hand, in a case where the lattice point is the endmost lattice point, that is, the identifier i−1 or i+1 of the lattice point corresponds to 1 or N when the number of lattice points in one dimension is N, $y'_{i-1}$ or $y'_{i+1}$ used in the definition of Equation (10) used in Equation (7) is undetermined. Thus, in a similar manner to a typical natural spline, the second-order derivative parameter is regarded as $y''_{i-1}=0$ or $y''_{i+1}=0$ to generate the objective function using Equation (6).

Figure 8:
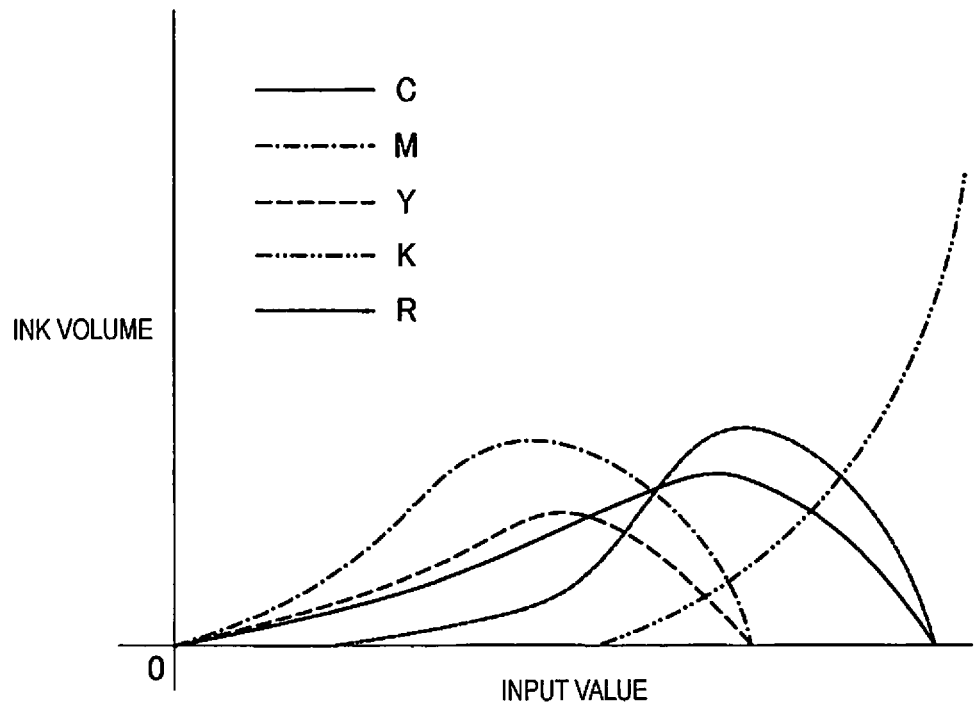
FIG. 8 illustrates generated volumes of CMYKR inks at gray lattice points according to an example.

A-3. Sample Evaluation:

FIG. 8 illustrates generated ink volumes of CMYKR colors at gray lattice points in an example. FIG. 8 schematically illustrates increase or decrease in the CMYKR ink volumes at the gray lattice points in a color conversion table created using the method for creating the color conversion table of this embodiment. In FIG. 8, the solid line indicates C ink, the dashed dotted line indicates M ink, the dashed line indicates Y ink, the dashed double dotted line indicates K (black) ink, and the short dashed line indicates R (red) ink. As illustrated in FIG. 8, the volumes of the CMYKR inks in the color conversion table created using the method for creating the color conversion table of this embodiment increase or decrease smoothly.

Figure 9:
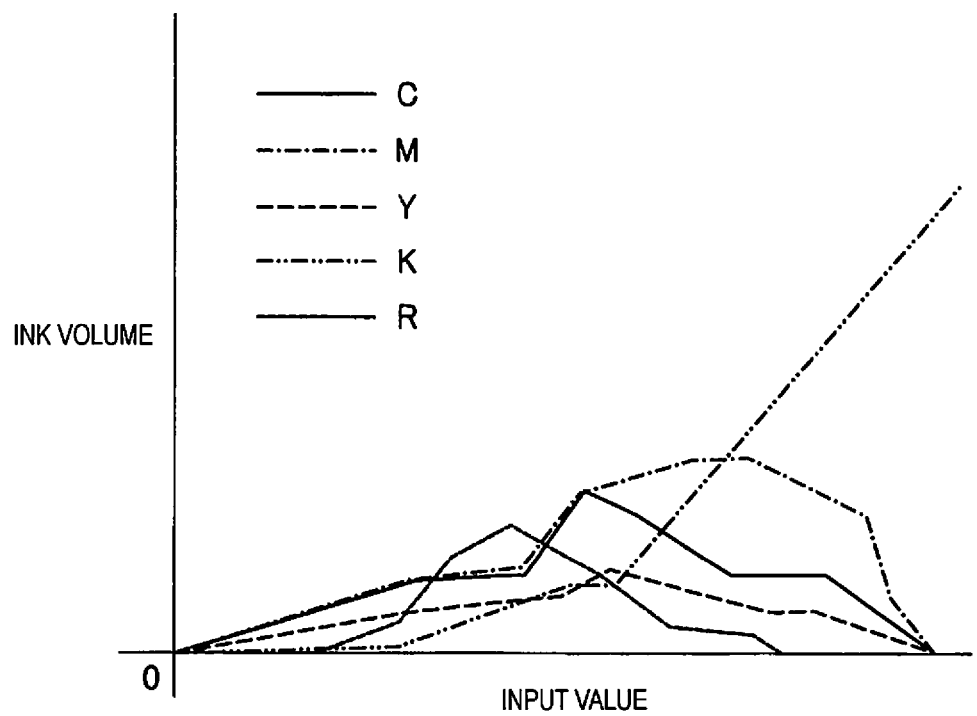
FIG. 9 illustrates generated volumes of CMYKR inks at gray lattice points according to a comparative example.

FIG. 9 illustrates generated ink volumes of CMYKR colors at gray lattice points in a comparative example. FIG. 9 schematically illustrates increase or decrease in the CMYKR ink volumes at the gray lattice points in a color conversion table created using a known method for creating a color conversion table as a comparative example. In FIG. 9, the increase or decrease in the CMYKR ink volumes is indicated by respective identical line types to those in FIG. 8. As illustrated in FIG. 9, any of the CMYKR inks do not increase or decrease smoothly compared with the example. Thus, the color conversion table created using the method for creating the color conversion table of the example enables printing with finer gradations in ink volumes compared with the color conversion table created using the method for creating the color conversion table of the comparative example.

Figure 10:
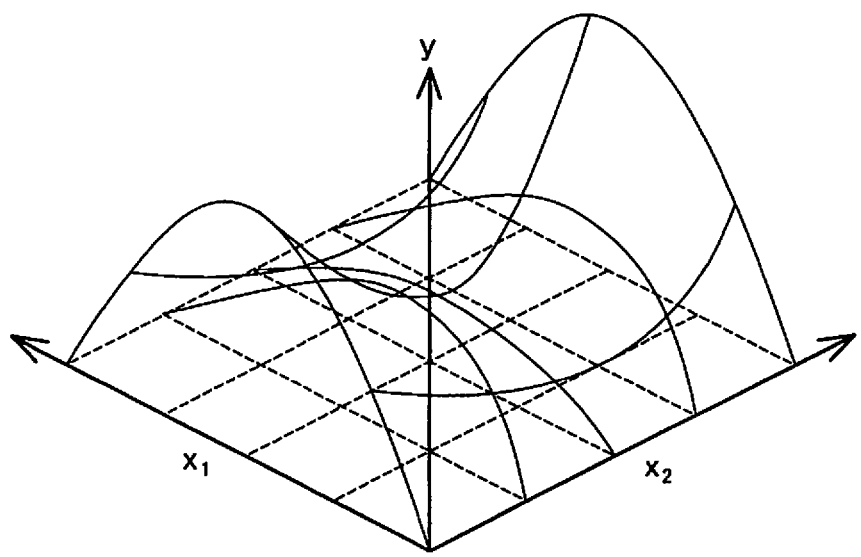
FIG. 10 illustrates a virtual chromatic value or an ink volume determined using an objective function generated in a gradation optimizing objective function generation process according to the first embodiment.

FIG. 10 illustrates the virtual chromatic value or the ink volume determined using the objective function generated in the gradation optimizing objective function generation process according to the first embodiment. FIG. 10 schematically illustrates an example of the virtual chromatic value calculated in the virtual chromatic value determination process or the ink volume calculated in the ink volume determination process in a case where the device color system is two-dimensional and the virtual chromatic value or the ink volume is one-dimensional. In FIG. 10, x indicates the space of the device color system, and y indicates the space of the virtual chromatic value or the ink volume. For the effect to be noticeable, FIG. 10 illustrates a processing result in a case where y is 0 when $x_1$ is 0 and $x_1$ is maximum and where a shape of convex quadratic function is generated at y when $x_2$ is 0 and $x_2$ is maximum. As is clear from FIG. 10, in such an extreme case as this, the method for this embodiment produces the calculated virtual chromatic value or ink volume to form a saddle-like shape. However, the shape is generated with smooth gradation.

As described above, in the method for creating the color conversion table according to this embodiment, the virtual chromatic value determining section 20 determines the virtual chromatic value using the cubic spline function connecting a plurality of lattice points by minimizing the sum of the squares of the second-order derivative parameters. As in the virtual chromatic value determination process executed by the virtual chromatic value determining section 20, the ink volume determining section 50 determines the combination of ink volumes assigned to each lattice point in the color conversion table using the cubic spline function connecting the plurality of lattice points to minimize the sum of the squares of the second-order derivative parameters. Consequently, the method for creating the color conversion table according to this embodiment enables printing with finer gradation in the ink volume as well as the fine gradation in the chromatic value on print results. Moreover, the method for creating the color conversion table of this embodiment allows a color conversion table to be prepared in advance, and also allows a color conversion table to be created when the printing condition changes. This increases convenience for a printer user.

Moreover, in the method for creating the color conversion table according to this embodiment, the color reproduction range determining section 30 executes the color reproduction range determination process to maximize the color reproduction range, and the ink volume maximizing section 40 sets combinations of inks to maximize the total ink volumes, resulting in an enhancement in graininess of a printout.

B. Second Embodiment

In a second embodiment, the objective function used in the virtual chromatic value determination process and in the ink volume determination process is different from the objective function used in the first embodiment, and the other processes are identical. In the first embodiment, the sum of the squares of the second-order derivative parameters of the first cubic spline function expressed by Equation (11) is set as the objective function per dimension in the gradation optimizing objective function generation process, and the virtual chromatic value and the ink volume at the lattice point to be processed is determined in the virtual chromatic value determination process and the ink volume determination process to minimize the objective function. In the gradation optimizing objective function generation process according to the second embodiment, with respect to first-order derivative parameters of a first cubic spline function and first-order derivative parameters of a second cubic spline function defined adjacent to the first cubic spline function in a direction different from the direction of definition of the first cubic spline function, an objective function is generated such that the first-order derivative parameters of the first and second cubic spline functions are expected to be identical to each other to the greatest extent practicable. Note that the direction of definition of the second cubic spline function is identical to the direction of definition of the first cubic spline function.

Figure 11:
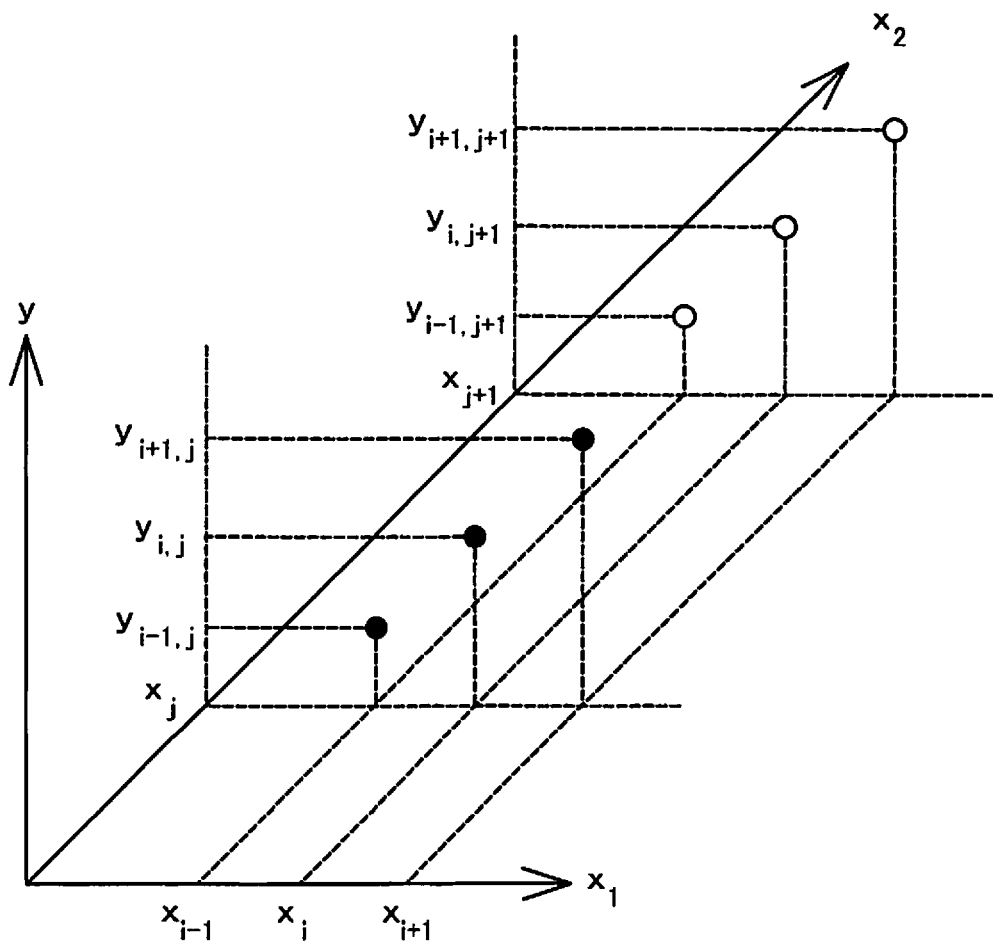
FIG. 11 illustrates a method for creating an objective function of the gradation optimizing objective function generation process according to a second embodiment or a third embodiment.

FIG. 11 is a schematic diagram illustrating the objective function according to the second embodiment in a case where the device color system is two-dimensional and the virtual chromatic value or the ink volume is one-dimensional. In the gradation optimizing objective function generation process according to the second embodiment, first, a first cubic spline function is defined in a direction of $x_1$ in FIG. 11 using a dependent variable $y_{i-1,j}$, $y_{i,j}$, and $y_{i+1,j}$ at lattice points along $x_2 = x_j$ and an independent variable $x_{i-1}$, $x_i$, and $x_{i+1}$ corresponding to $x_1$. In FIG. 11, the first cubic spline function is defined by the dependent variables indicated by filled circles.

Next, dependent variables at another lattice points which have the known virtual chromatic values or ink volumes and are adjacent in a direction different from the direction of definition of the first cubic spline function, that is, a direction of $x_2$ in FIG. 11, are indicated by $y_{i-1,j+1}$, $y_{i,j+1}$, and $y_{i+1,j+1}$ along $x_2 = x_{j+1}$. A second cubic spline function is defined using these dependent variables and the independent variable identical to the independent variable of the first cubic spline function. In FIG. 11, the second cubic spline function is defined by the dependent variables indicated by hollow circles.

In the gradation optimizing objective function generation process according to the second embodiment, the sum of the squares of the differences between the first-order derivative parameters of the first and second cubic spline functions is generated as an objective function. Note that the another lattice points adjacent in the direction of $x_2$ also exist in the negative direction of $x_2$. Also, in a case where the dimension of the independent variable is greater than two, the number of directions different from the direction of definition of the first and second cubic spline functions, that is, directions in which adjacent relations are defined, increases. In these cases, the corresponding terms can be added up in the objective function. Furthermore, the direction of definition of the first cubic spline function can be selected as many as the number of dimensions of the independent variable. These terms can also be added up in the objective function. The first-order derivative parameter of the cubic spline function can be determined using the calculation method described in the first embodiment.

The objective function generated as above can be expressed by Equation (13).

[Equation 13]

$$E = \frac{1}{(x_j - x_{j-1})^2} \left| \frac{\partial}{\partial x_1} \begin{bmatrix} y_{i-1,j} \\ y_{ij} \\ y_{i+1,j} \end{bmatrix} - \frac{\partial}{\partial x_1} \begin{bmatrix} y_{i-1,j-1} \\ y_{ij-1} \\ y_{i+1,j-1} \end{bmatrix} \right|^2 + \qquad (13)$$

$$\frac{1}{(x_{j+1} - x_j)^2} \left| \frac{\partial}{\partial x_1} \begin{bmatrix} y_{i-1,j+1} \\ y_{ij+1} \\ y_{i+1,j+1} \end{bmatrix} - \frac{\partial}{\partial x_1} \begin{bmatrix} y_{i-1,j} \\ y_{ij} \\ y_{i+1,j} \end{bmatrix} \right|^2 +$$

$$\frac{1}{(x_i - x_{i-1})^2} \left| \frac{\partial}{\partial x_2} \begin{bmatrix} y_{ij-1} \\ y_{ij} \\ y_{ij+1} \end{bmatrix} - \frac{\partial}{\partial x_2} \begin{bmatrix} y_{i-1,j-1} \\ y_{i-1,j} \\ y_{i-1,j+1} \end{bmatrix} \right|^2 +$$

$$\frac{1}{(x_{i+1} - x_i)^2} \left| \frac{\partial}{\partial x_2} \begin{bmatrix} y_{i+1,j-1} \\ y_{i+1,j} \\ y_{i+1,j+1} \end{bmatrix} - \frac{\partial}{\partial x_2} \begin{bmatrix} y_{ij-1} \\ y_{ij} \\ y_{ij+1} \end{bmatrix} \right|^2$$

Note that the first-order derivative parameter of the cubic spline is expressed as a partial derivative of the vector in Equation (13). Moreover, the coefficient terms of $1/(x_j-x_{j-1})^2$, $1/(x_{i+1}-x_j)^2$, $1/(x_i-x_{i-1})^2$, and $1/(x_{i+1}-x_1)^2$ in Equation (13) are intended as correction in a case where intervals between the lattice points are uneven.

The first-order derivative parameters $\partial y/\partial x$ in Equation (13) can be determined as y' in Equation (5) described in the first embodiment, and the second-order derivative parameters y" used in the right side of Equation (5) can also be determined using Equation (7) described in the first embodiment. Thus, the objective function acquired as Equation (13) is a function of an unknown dependent variable $y_{i,j}$ as in the first embodiment. Note that the unknown dependent variable in Equation (7) is expressed as $y_i$.

Figure 12:
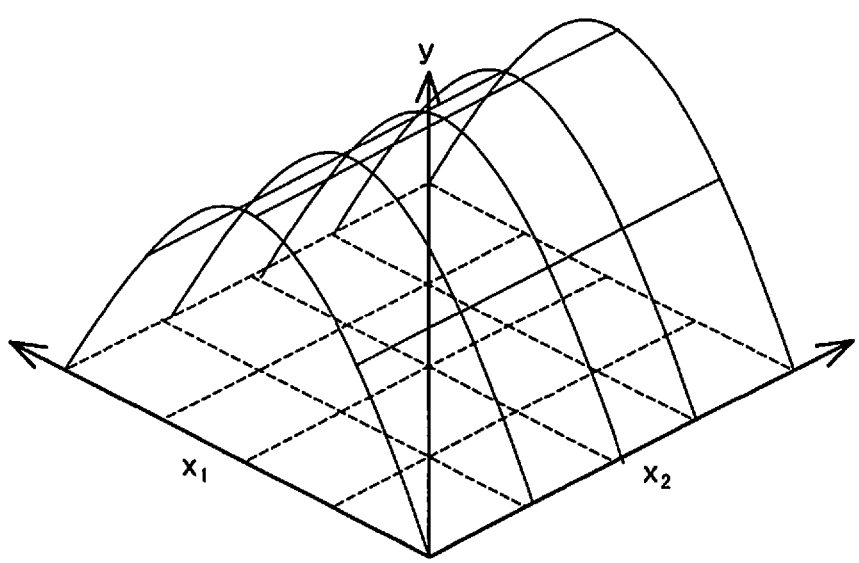
FIG. 12 illustrates a virtual chromatic value or an ink volume determined using the objective function generated in the gradation optimizing objective function generation process according to the second embodiment or the third embodiment.

FIG. 12 illustrates the virtual chromatic value or the ink volume determined using the objective function generated in the gradation optimizing objective function generation process according to the second embodiment or a third embodiment. FIG. 12 illustrates an example of the virtual chromatic value calculated in the virtual chromatic value determination process or the ink volume calculated in the ink volume determination process in the second embodiment under the condition identical to the condition in FIG. 10 of the first embodiment. The second embodiment has an effect of making the shapes of the first and second cubic spline functions resemble each other. Thus, a shape similar to the saddle like shape described in FIG. 10 of the first embodiment does not occur. Instead, shapes similar to the convex quadratic functions generated at the lattice points $x_2=0$ and $x_2=$maximum are also obtained at the other lattice points.

In the method for creating the color conversion table according to the second embodiment, the objective function substituting the sum of the squares of the second-order derivative parameters of the first cubic spline functions of the first embodiment is set in the gradation optimizing objective function generation process as described above. The objective function set in the second embodiment is the sum of the squares of the differences between the first-order derivative parameters of the first and second cubic spline functions in the direction along which the first and second cubic spline functions are adjacent to each other. The virtual chromatic value determining section 20 and the ink volume determining section 50 according to the second embodiment respectively determine the virtual chromatic value and the ink volume to minimize the objective function. Thus, in the method for creating the color conversion table according to the second embodiment, the virtual chromatic value or the ink volume that changes smoothly is also determined in a case where, for example, the curvature of the curved surface (a hypersurface in a case of a device color system in three or more dimensions) is large for some reason such as maximization of the color reproduction range while the curvature is maintained.

C. Third Embodiment

In a third embodiment, the objective function used in the virtual chromatic value determination process and in the ink volume determination process is different from the objective function used in the second embodiment, and the other processes are identical. In the second embodiment, the sum of the squares of the differences between the first-order derivative parameters of the first cubic spline function and the first-order derivative parameters of the second cubic spline function defined adjacent to the first cubic spline function expressed by Equation (13) in the direction along which the first and second cubic spline functions are adjacent to each other is set as the objective function in the gradation optimizing objective function generation process, and the virtual chromatic value and the ink volume at the lattice point to be processed are respectively determined in the virtual chromatic value determination process and the ink volume determination process to minimize the objective function. In the gradation optimizing objective function generation process according to the third embodiment, the sum of the squares of the differences between the second-order derivative parameters of the first cubic spline function and the second-order derivative parameters of the second cubic spline function defined adjacent to the first cubic spline function in the direction along which the first and second cubic spline functions are adjacent to each other is generated as an objective function.

In generation of the objective function of the third embodiment, the first and second cubic spline functions are also defined in a similar manner to the second embodiment described with reference to FIG. 11, and the sum of the squares of the differences between the second-order derivative parameters in the direction along which the cubic spline functions are adjacent to each other is generated as the objective function. Thus, the first-order derivatives in Equation (13) are replaced with the second-order derivatives in Equation (14), which is defined as the objective function of the third embodiment. Note that Equation (14) is also an example of a case where the device color system is two-dimensional and the virtual chromatic value or the ink volume is one-dimensional as is Equation (13).

[Equation 14]

$$E = \frac{1}{(x_j - x_{j-1})^2} \left\| \frac{\partial^2}{\partial x_1^2} \begin{bmatrix} y_{i-1\,j} \\ y_{ij} \\ y_{i+1\,j} \end{bmatrix} - \frac{\partial^2}{\partial x_1^2} \begin{bmatrix} y_{i-1\,j-1} \\ y_{ij-1} \\ y_{i+1\,j-1} \end{bmatrix} \right\|^2 + \quad (14)$$

$$\frac{1}{(x_{j+1} - x_j)^2} \left\| \frac{\partial^2}{\partial x_1^2} \begin{bmatrix} y_{i-1\,j+1} \\ y_{ij+1} \\ y_{i+1\,j+1} \end{bmatrix} - \frac{\partial^2}{\partial x_1^2} \begin{bmatrix} y_{i-1\,j} \\ y_{ij} \\ y_{i+1\,j} \end{bmatrix} \right\|^2 +$$

$$\frac{1}{(x_i - x_{i-1})^2} \left\| \frac{\partial^2}{\partial x_2^2} \begin{bmatrix} y_{ij-1} \\ y_{ij} \\ y_{ij+1} \end{bmatrix} - \frac{\partial^2}{\partial x_2^2} \begin{bmatrix} y_{i-1\,j-1} \\ y_{i-1\,j} \\ y_{i-1\,j+1} \end{bmatrix} \right\|^2 +$$

$$\frac{1}{(x_{i+1} - x_i)^2} \left\| \frac{\partial^2}{\partial x_2^2} \begin{bmatrix} y_{i+1\,j-1} \\ y_{i+1\,j} \\ y_{i+1\,j+1} \end{bmatrix} - \frac{\partial^2}{\partial x_2^2} \begin{bmatrix} y_{ij-1} \\ y_{ij} \\ y_{ij+1} \end{bmatrix} \right\|^2$$

The second-order derivative parameters $\partial^2 y/\partial x^2$ in Equation (14) can be determined from y″ in Equation (7) described in the first embodiment. Thus, the objective function derived by Equation (14) is a function of an unknown dependent variable $y_{i,j}$ as are the objective functions in the first and second embodiments.

The result of calculation of the virtual chromatic value in the virtual chromatic value determination process or the ink volume in the ink volume determination process in the third embodiment under the condition identical to the condition in FIG. 10 of the first embodiment and the condition in FIG. 12 of the second embodiment is substantially identical to the result illustrated in FIG. 12 of the second embodiment. Thus, the virtual chromatic value or the ink volume determined in the third embodiment also has features similar to the features of the second embodiment.

In the method for creating the color conversion table according to the third embodiment, the objective function using the second-order derivative parameters instead of the first-order derivative parameters included in the objective function of the second embodiment is generated in the gradation optimizing objective function generation process as described above. Specifically, the objective function set in the third embodiment is the sum of the squares of the differences between the second-order derivative parameters of the first and second cubic spline functions in the direction along which the first and second cubic spline functions are adjacent to each other. The virtual chromatic value determining section 20 and the ink volume determining section 50 according to the third embodiment respectively determine the virtual chromatic value and the ink volume to minimize the objective function. Thus, in the method for creating the color conversion table according to the third embodiment, the virtual chromatic value or the ink volume that changes smoothly is also determined in a case where the curvature of the hypersurface is large for some reason while the curvature is maintained as in the second embodiment.

D. Modified Example

The present invention is not limited to the above-described embodiments, and can be carried out in various modes within the scope of the invention. For example, the following modifications are also possible.

In the first embodiment, the second embodiment, or the third embodiment, both the virtual chromatic value and the ink volume are respectively determined in the virtual chromatic value determination process and in the ink volume determination process using the objective functions generated in the gradation optimizing objective function generation process. However, selection of the processes in which the objective functions are used can be modified in various ways. For example, either the virtual chromatic value or the ink volume may be determined in the virtual chromatic value determination process or in the volume determination process, respectively, using the objective functions generated in the gradation optimizing objective function generation process.

In the color conversion table creation process according to the first embodiment, the second embodiment, or the third embodiment, as illustrated in FIG. 2, various processes other than the virtual chromatic value determination process and the ink volume determination process are executed. However, these various processes are optional, and may not be executed. For example, the ink volume setting for the specific lattice point in Step S12 may not be performed, and the ink volumes of the entire lattice points may be calculated. Moreover, the color reproduction range determination process in Step S30 may not be executed. Furthermore, the ink volume maximization process in Step S40 may not be executed.

The color conversion table creating module 100 of the first embodiment determines the color conversion table including the inks of CMYK and R, which is a specific feature. However, various modifications are possible. For example, light color inks such as Lc (light cyan), Lm (light magenta), and Lk (light gray) may be added. Moreover, other specific colors may be used.

REFERENCE SIGNS LIST

N . . . The number of lattice points, p, $p_v$ . . . Virtual chromatic value vector, q . . . Ink volume vector, K . . . Transformation matrix, i, j . . . Lattice point position identifier, x . . . Independent variable, y . . . Dependent variable, A, B . . . Matrix, c . . . Vector, E . . . Objective function, v, $v_s$ . . . Color reproduction range expanding direction, $S_1$, $S_2$ . . . Limitation plane, 10 . . . Lattice point selecting section, 20 . . . Virtual chromatic value determining section, 21 . . . Virtual chromatic value determining objective function generating section, 30 . . . Color reproduction range determining section, 40 . . . Ink volume maximizing section, 50 . . . Ink volume determining section, 51 . . . Ink volume determining objective function generating section, 100 . . . Color conversion table creating module

The invention claimed is:

1. A method for creating a color conversion table for determining an ink volume discharged by a printer, the method comprising:

a virtual chromatic value determination step of determining a plurality of virtual chromatic values at a lattice point in a color conversion table in a virtual color space; and an ink volume determination step of determining a combination of the ink volumes at the lattice point in the color conversion table based on a predetermined transformation coefficient and the virtual chromatic value, wherein at least one of the virtual chromatic value determination step or the ink volume determination step is performed using a cubic spline function defined by the plurality of virtual chromatic values or the ink volume.

2. The method for creating the color conversion table according to claim 1, wherein at least one of the virtual chromatic value determination step or the ink volume determination step defines a first cubic spline function, the first cubic spline function having the virtual chromatic value or the ink volume as a dependent variable and a value of a lattice point in a device color system as an independent variable with respect to three consecutive lattice points to be processed, the three consecutive lattice points to be processed including an intermediate lattice point with the virtual chromatic value or the ink volume to be determined and two end lattice points with the virtual chromatic values or the ink volumes that are already determined sandwiching the intermediate lattice point, and determines the virtual chromatic value or the ink volume at the intermediate lattice point to minimize a sum of squares of second-order derivative parameters of the first cubic spline function at the three lattice points to be processed.

3. The method for creating the color conversion table according to claim 1, wherein at least one of the virtual chromatic value determination step or the ink volume determination step defines a first cubic spline function, the first cubic spline function having the virtual chromatic value or the ink volume as a dependent variable and a value of a lattice point in a device color system as an independent variable with respect to three consecutive lattice points to be processed, the three consecutive lattice points to be processed including an intermediate lattice point with the virtual chromatic value or the ink volume to be determined and two end lattice points with the virtual chromatic values or the ink volumes that are already determined sandwiching the intermediate lattice point, defines a second cubic spline function, the second cubic spline function having the virtual chromatic value or the ink volume as a dependent variable and a value of a lattice point in a device color system as an independent variable with respect to another three lattice points with the virtual chromatic values and the ink volumes that are already determined, the another three lattice points being respectively adjacent to the three lattice points to be processed in a direction different from a direction of definition of the first cubic spline function, the second cubic spline function being defined in a direction identical to the direction of definition of the first cubic spline function, and determines the virtual chromatic value or the ink volume at the intermediate lattice point to minimize a sum of squares of differences between a first-order derivative parameter determined by the first cubic spline function and a first-order derivative parameter determined by the second cubic spline function of respective sets of the lattice points adjacent to each other in the direction different from the direction of definition of the first and second cubic spline functions.

4. The method for creating the color conversion table according to claim 1, wherein at least one of the virtual chromatic value determination step or the ink volume determination step defines a first cubic spline function, the first cubic spline function having the virtual chromatic value or the ink volume as a dependent variable and a value of a lattice point in a device color system as an independent variable with respect to three consecutive lattice points to be processed, the three consecutive lattice points to be processed including an intermediate lattice point with the virtual chromatic value or the ink volume to be determined and two end lattice points with the virtual chromatic values or the ink volumes that are already determined sandwiching the intermediate lattice point, defines a second cubic spline function, the second cubic spline function having the virtual chromatic value or the ink volume as a dependent variable and a value of a lattice point in the device color system as an independent variable with respect to another three lattice points with the virtual chromatic values and the ink volumes that are already determined, the another three lattice points being respectively adjacent to the three lattice points to be processed in a direction different from a direction of definition of the first cubic spline function, the second cubic spline function being defined in a direction identical to the direction of definition of the first cubic spline function, and determines the virtual chromatic value or the ink volume at the intermediate lattice point to minimize a sum of squares of differences between a second-order derivative parameter determined by the first cubic spline function and a second-order derivative parameter determined by the second cubic spline function of respective sets of the lattice points adjacent to each other in the direction different from the direction of definition of the first and second cubic spline functions.

5. The method for creating the color conversion table according to claim 2, further comprising:

a color reproduction range determination step of maximizing a color reproduction range in the virtual color space before the ink volume determination step.

6. The method for creating the color conversion table according to claim 3, further comprising:

a color reproduction range determination step of maximizing a color reproduction range in the virtual color space before the ink volume determination step.

7. The method for creating the color conversion table according to claim 4, further comprising:

a color reproduction range determination step of maximizing a color reproduction range in the virtual color space before the ink volume determination step.

8. The method for creating the color conversion table according to claim 1, further comprising:

an ink volume maximization step of increasing a sum total of values of the ink volumes.

9. The method for creating the color conversion table according to claim 2, further comprising:

an ink volume maximization step of increasing a sum total of values of the ink volumes.

10. The method for creating the color conversion table according to claim 3, further comprising:

an ink volume maximization step of increasing a sum total of values of the ink volumes.

11. The method for creating the color conversion table according to claim 4, further comprising:

an ink volume maximization step of increasing a sum total of values of the ink volumes.

12. The method for creating the color conversion table according to claim 5, further comprising:

an ink volume maximization step of increasing a sum total of values of the ink volumes.

* * * * *